United States Patent
Tomita

(10) Patent No.: US 6,824,200 B2
(45) Date of Patent: Nov. 30, 2004

(54) BODY STRUCTURE

(75) Inventor: Tatsuzo Tomita, Tokyo (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/685,663

(22) Filed: Oct. 15, 2003

(65) Prior Publication Data

US 2004/0080187 A1 Apr. 29, 2004

Related U.S. Application Data

(63) Continuation of application No. PCT/JP03/00542, filed on Jan. 22, 2003.

(30) Foreign Application Priority Data

Jan. 22, 2002 (JP) .................................... 2002-012405

(51) Int. Cl.⁷ .............................................. B62D 25/02
(52) U.S. Cl. ............................ 296/187.08; 296/187.12; 296/193.07; 296/193.05; 296/203.03; 296/209
(58) Field of Search ....................... 296/187.08, 187.12, 296/193.07, 193.05, 203.03, 209

(56) References Cited

FOREIGN PATENT DOCUMENTS

| JP | 60259577 A | * 12/1985 | ................. 296/204 |
| JP | 62105779 A | * 5/1987 | ................. 296/209 |
| JP | 62-92984 U | 6/1987 | |
| JP | 2-45885 U | 3/1990 | |
| JP | 06166383 A | * 6/1994 | ................. 296/209 |
| JP | 2977301 B2 | 9/1999 | |
| JP | 2977302 B2 | 9/1999 | |

* cited by examiner

*Primary Examiner*—Jason Morrow
(74) *Attorney, Agent, or Firm*—Rossi & Associates

(57) ABSTRACT

A rear side member is composed of an upper member and a lower member. A flange of the upper member and a flange of the lower member are spot-welded to each other. An end edge of the upper member and a flange of the lower member are individually spot-welded to a side sill. A flange of the lower member is spot-welded to the lower surface of the upper member. A flange of the upper member and an end edge of the lower member are spot-welded to a rear wheel house. Thus, the upper member and the lower member form a closed cross section. A side edge portion of a rear floor panel is spot-welded to the upper surface of the flange.

4 Claims, 5 Drawing Sheets

BODY STRUCTURE

CROSS-REFERENCE TO RELATED APPLICATIONS

This is a Continuation Application of PCT Application No. PCT/JP03/00542, filed Jan. 22, 2003, which was not published under PCT Article 21(2) in English.

This application is based upon and claims the benefit of priority from the prior Japanese Patent Application No. 2002-012405, filed Jan. 22, 2002, the entire contents of which are incorporated herein by reference.

BACKGROUND OF THE INVENTION

1. Field of the Invention

The present invention relates to a structure of a vehicle near a rear side member to which a side edge portion of a rear floor panel is coupled.

2. Description of the Related Art

In a conventional vehicle, as is illustrated in FIGS. 7 to 9, a rear side member 1 that extends substantially in the longitudinal direction of the body of the vehicle has its flange a coupled to the lower surface of a side edge portion of a rear floor panel 2. In order to enhance the strength of the vehicle body, the stiffness of the rear side member 1 must be increased. To attain this, a flange b and an end edge c of the rear side member 1 and an end edge d and a flange e of the rear floor panel 2 that covers the upper surface of the rear side member 1 are spot-welded individually to a side sill 3 and a rear wheel house 4. Thus, the rear side member 1 forms a closed cross section 5 in cooperation with the rear floor panel 2 and the like.

In order to restrain the weight of the vehicle from increasing, a thin sheet is used for the rear floor panel 2 that forms a relatively wide floor of the vehicle. Thus, the stiffness of the closed cross section 5 can be improved only limitedly. In order to increase the stiffness of parts near the rear side member 1, reinforcing members, such as bulkheads, may possibly be added to the rear side member 1. If the added reinforcing members are increased in number, however, the weight of the vehicle body increases correspondingly.

In order to widen the interior space of the vehicle to the maximum, the rear floor panel 2 is stepped in the longitudinal direction of the vehicle so that the front side of the vehicle is lowered, and the central portion of the rear floor panel 2 is made lower than its opposite side edge portions. Thus, drawing the rear floor panel 2 is relatively hard.

Further, the rear side member 1 of which the upper surface is covered by a side edge portion of the rear floor panel 2 must be also stepped in the longitudinal direction of the vehicle. However, forming the rear side member 1 with a large hat-shaped cross section is subject to drawing limits, so that it is hard to increase the height of the vertical wall of the rear side member 1. Thus, increasing the strength of the rear side member 1 or deeply depressing the central portion of the rear floor panel 2 is restricted, so that the interior space of the vehicle cannot be increased smoothly.

BRIEF SUMMARY OF THE INVENTION

The object of the present invention is to facilitate the enhancement of the strength of parts of a vehicle near a rear side member to which a side edge portion of a rear floor panel is coupled.

A body structure according to the present invention comprises a side sill which extends substantially in the longitudinal direction of a vehicle beside the vehicle and forms a first closed cross section, a side member at least a part of which extends substantially in the longitudinal direction of the vehicle on the vehicle-interior side of the side sill, which forms a second closed cross section in cooperation with the side sill, and which is formed having a flange extending substantially in the longitudinal direction of the vehicle at the interior-side end portion of the vehicle, and a floor panel having a side edge portion coupled to the flange.

More specifically, the side member forms the second closed cross section in cooperation with the side sill, the flange that extends substantially in the longitudinal direction of the vehicle is formed on the vehicle-interior-side end portion of the side member, and the side edge portion of the floor panel is coupled to the flange. Thus, the stiffness of the second closed cross section part of the side member can be easily increased without regard to the floor panel. In consequence, the strength of parts near the rear side member can be made much higher than in the conventional case.

According to the body structure of the present invention, the stiffness of the second closed cross section part of the side member can be easily increased without regard to the floor panel, so that the strength of the parts near the rear side member can be made much higher than in the conventional case. Thus, the strength of the body of the vehicle can be enhanced with ease, so that the safety of the vehicle can be ensured.

DETAILED DESCRIPTION OF THE INVENTION

Figure 1:
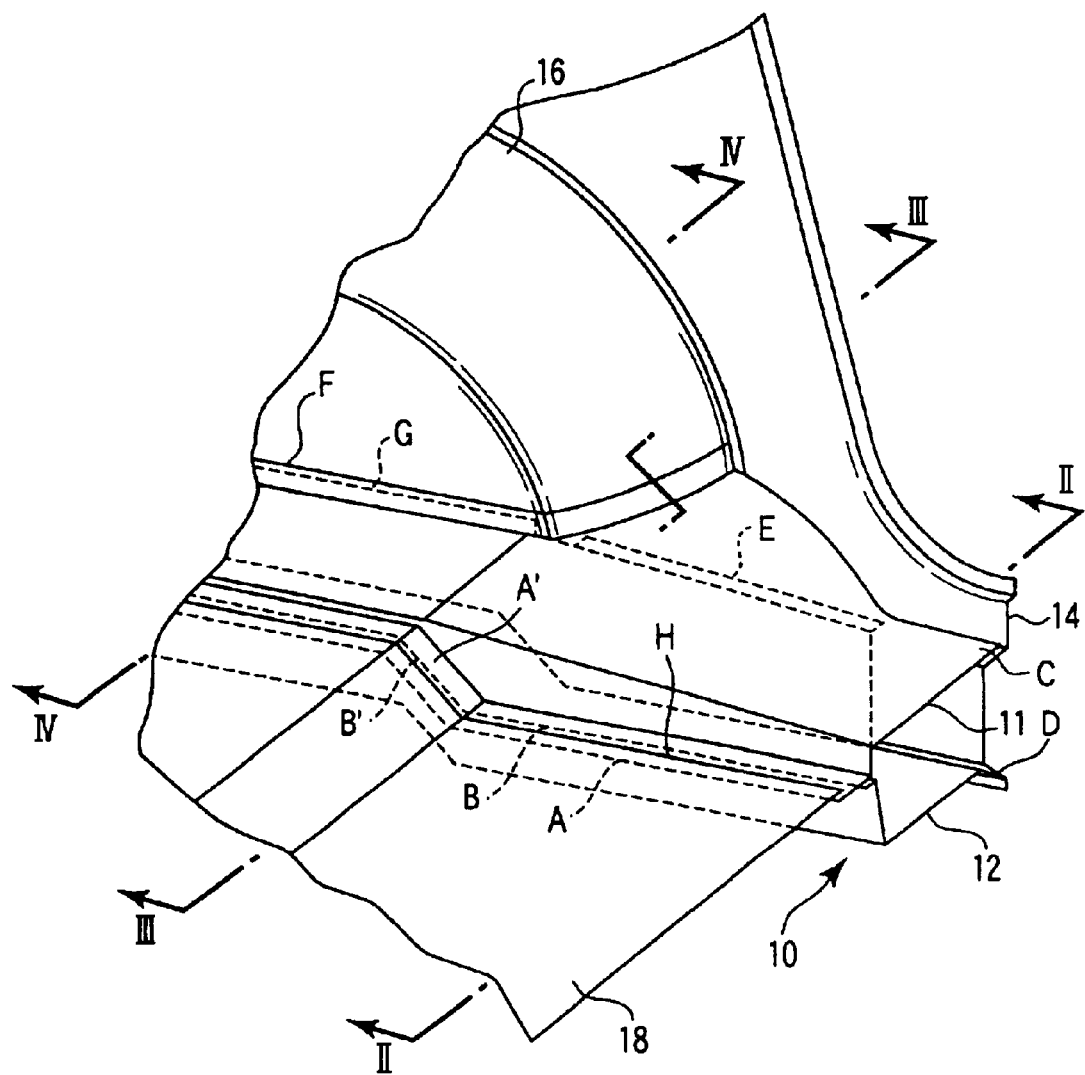
FIG. 1 is a schematic perspective view showing a part of a vehicle body according to an embodiment of the present invention.
Figure 2:
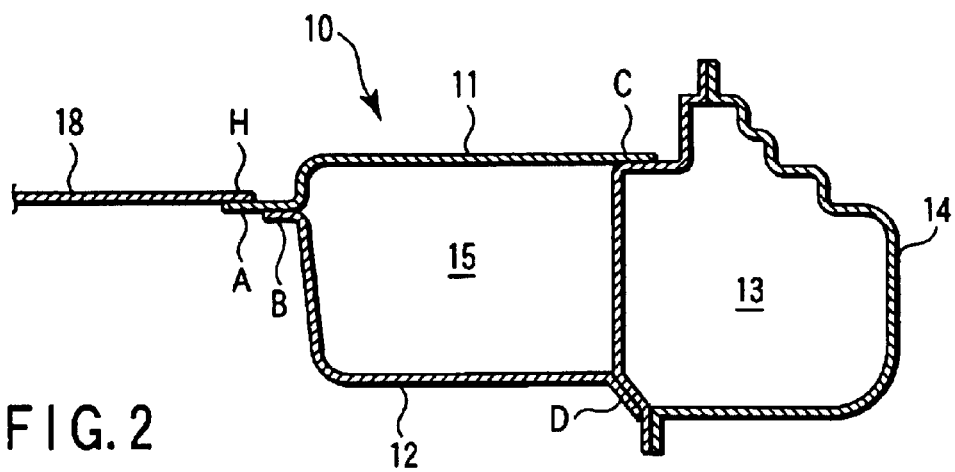
FIG. 2 is a sectional view taken along line II—II of FIG. 1.
Figure 3:
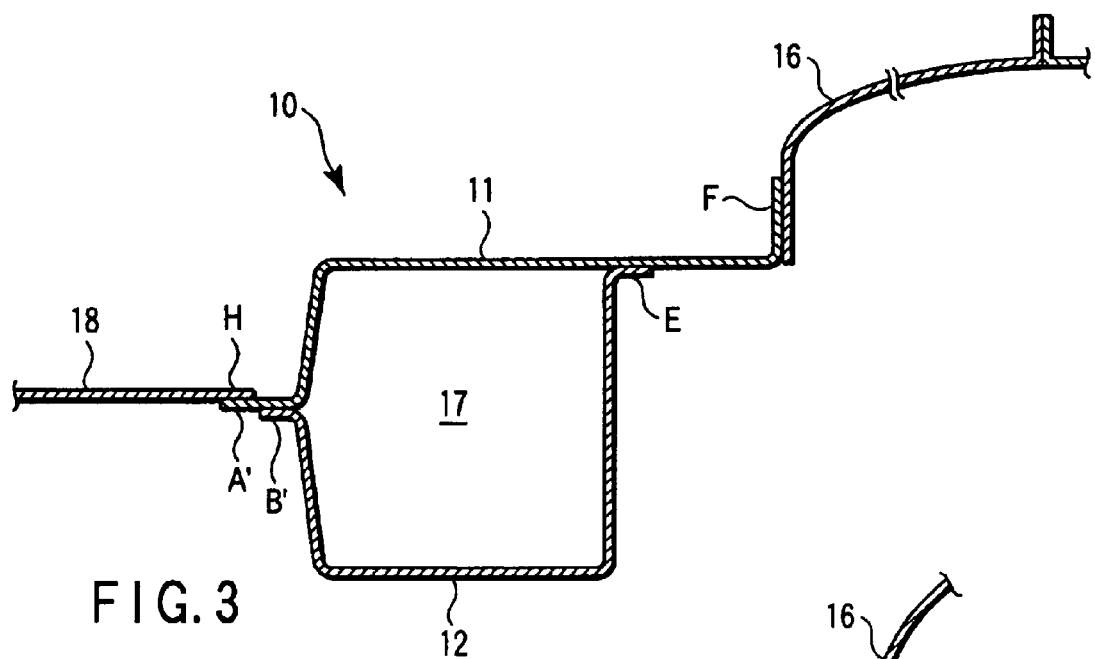
FIG. 3 is a sectional view taken along line III—III of FIG. 1.
Figure 4:
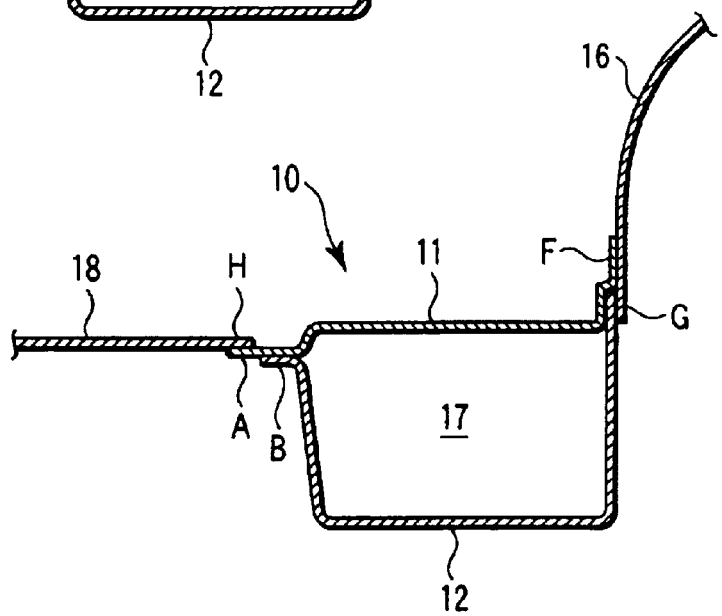
FIG. 4 is a sectional view taken along line IV—IV of FIG. 1.

An embodiment of the present invention will now be described with reference to FIGS. 1 to 4. Like portions that are used in the aforementioned prior art example are denoted individually by the same numerals as they are described.

In the embodiment shown in FIGS. 1 to 4, a rear side member 10 that extends substantially in the longitudinal direction of a vehicle body comprises an upper member 11 and a lower member 12. The upper surface of a vehicle-interior-side flange B of the lower member 12 is spot-welded to the lower surface of a vehicle-interior-side flange A of the upper member 11. The two flanges A and B sharply decline toward the front part of the vehicle from intermediate portions A' and B', respectively.

A side sill 14 extends substantially in the longitudinal direction of the vehicle and forms a first closed cross section 13. A vehicle-exterior-side end edge C of the upper member 11 is spot-welded to the side sill 14. A vehicle-exterior-side flange D of the lower member 12 is spot-welded to the side sill 14. Thus, the upper member 11, lower member 12, and side sill 14 form a second closed cross section 15.

On the vehicle-rear side of the side sill 14, moreover, a vehicle-exterior-side flange E of the lower member 12 is spot-welded to the lower surface of the upper member 11. At the rear part of the vehicle, furthermore, a flange F of the upper member 11 and an end edge G of the lower member 12 are spot-welded to a rear wheel house 16. Thus, the upper member 11 and the lower member 12 form a third closed cross section 17 that is substantially continuous with the vehicle-rear side of the closed cross section 15.

A rear floor panel 18 that forms the floor of the vehicle is bent in the longitudinal direction of the vehicle along the flange A of the upper member 11. A side edge portion H of the rear floor panel 18 is spot-welded to the upper surface of the flange A.

The upper member 11 and the lower member 12 constitute the rear side member 10. Since the upper member 11 and the lower member 12 can be formed individually, their forming is easy. Since the thickness of the upper member 11 and the lower member 12 can be selected freely, moreover, the stiffness of the parts around the closed cross sections 15 and 17 can be easily increased without regard to the thickness of the floor panel 18.

Besides, the closed cross section 15, along with the closed cross section 13 of the side sill 14, extends in the longitudinal direction of the vehicle, and the closed cross sections 15 and 17 are formed substantially continuously in the longitudinal direction of the vehicle. Therefore, the strength of the vehicle body near the rear side member 10 against a flank collision or the like can be enhanced with ease. In consequence, the safety of the vehicle can be ensured, and reinforcing members, such as bulkheads, for the rear side member 10 can be saved, so that the construction of the vehicle body can be simplified.

Further, the upper member 11 and the lower member 12 can be easily formed, and the respective height levels of the flange A of the upper member 11 and the flange B of the lower member 12 that are spot-welded to each other can be adjusted with ease. Besides, the rear floor panel 18 is coupled to the rear side member 10 with its side edge portion H spot-welded to the flange A.

Thus, the rear floor panel 18 can be given a simple shape such that it is bent in the longitudinal direction of the vehicle, so that it can be formed very easily. At the same time, the rear floor panel 18 can be sharply inclined downward at the parts corresponding to the intermediate portions A' and B' of the two flanges A and B, so that the degree of freedom of the vehicle body layout can be improved.

Besides, that part of the rear floor panel 18 which adjoins the side sill 14 is located at a low level. Therefore, the interior space of the vehicle above it can be easily widened, and the degree of freedom of the seat layout can be improved. Further, the ridability of the vehicle can be improved with ease.

As described above, the strength of the vehicle body near the rear side member 10 can be enhanced with ease. In addition, a thin sheet may be used without any special hindrance as the rear floor panel 18 of which the side edge portion H is spot-welded to the flange A of the upper member 11. Furthermore, the rear floor panel 18 can be easily spot-welded to the upper member 11, and the assembly of the vehicle body by welding can be facilitated. These are great advantages.

Figure 5:
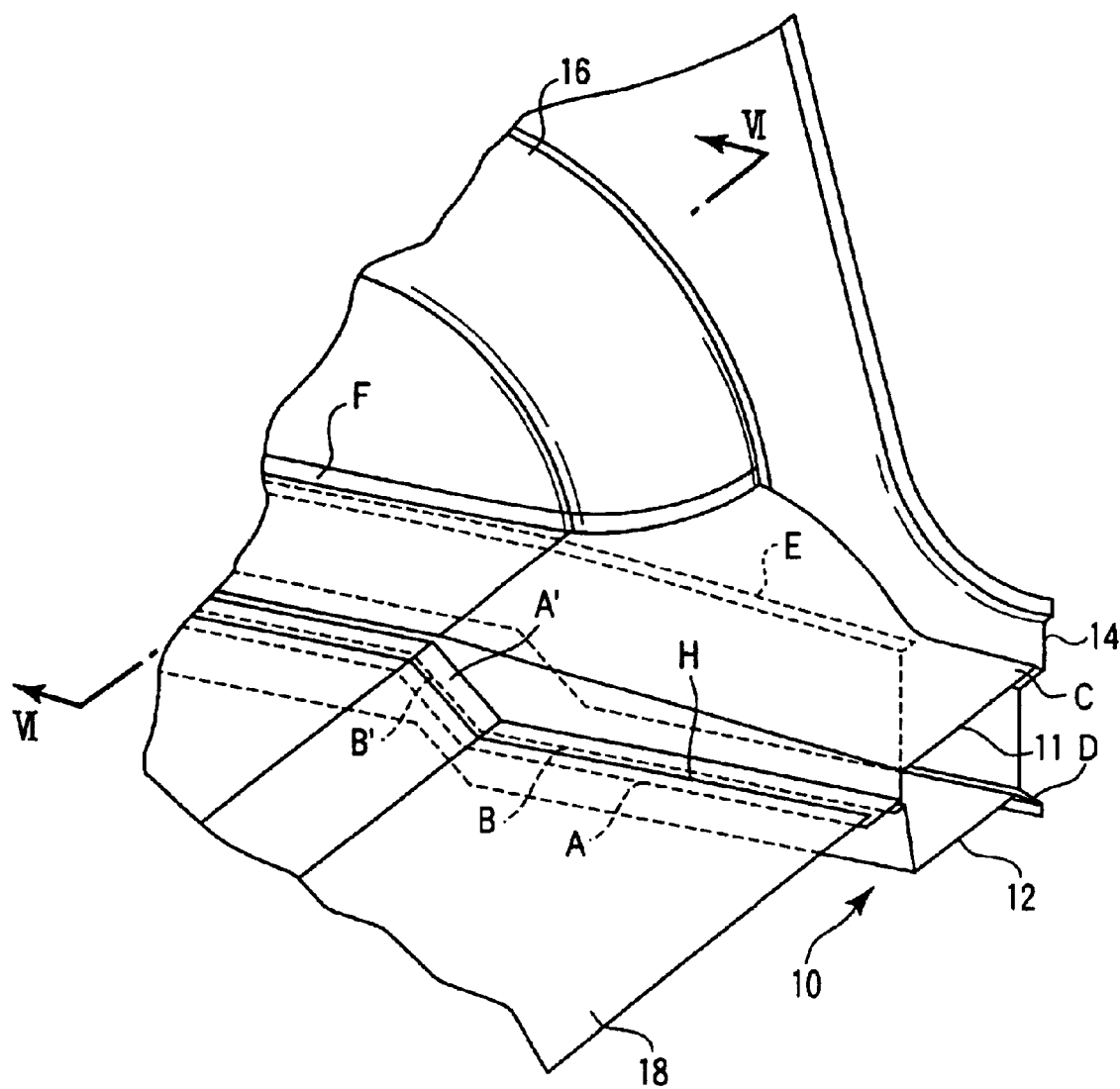
FIG. 5 is a schematic perspective view showing a part of a vehicle body according to another embodiment of the present invention.
Figure 6:
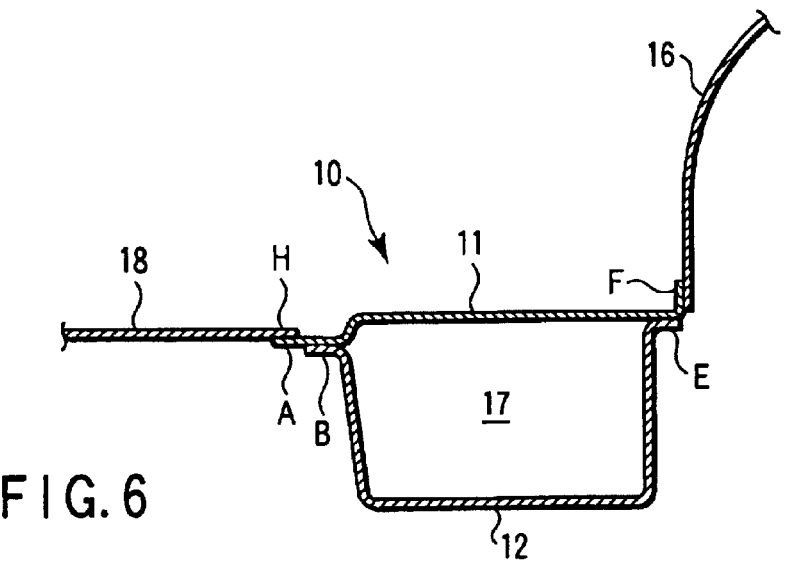
FIG. 6 is a sectional view taken along line VI—VI of FIG. 5.
Figure 8:
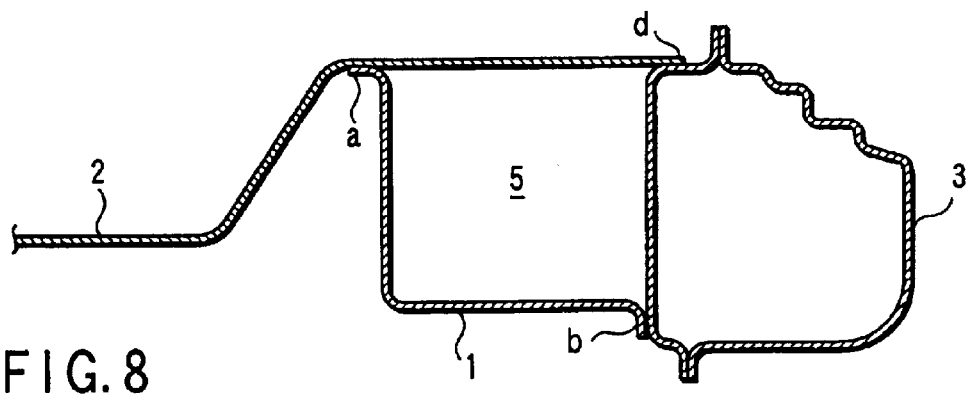
FIG. 8 is a sectional view taken along line VIII—VIII of FIG. 7.
Figure 9:
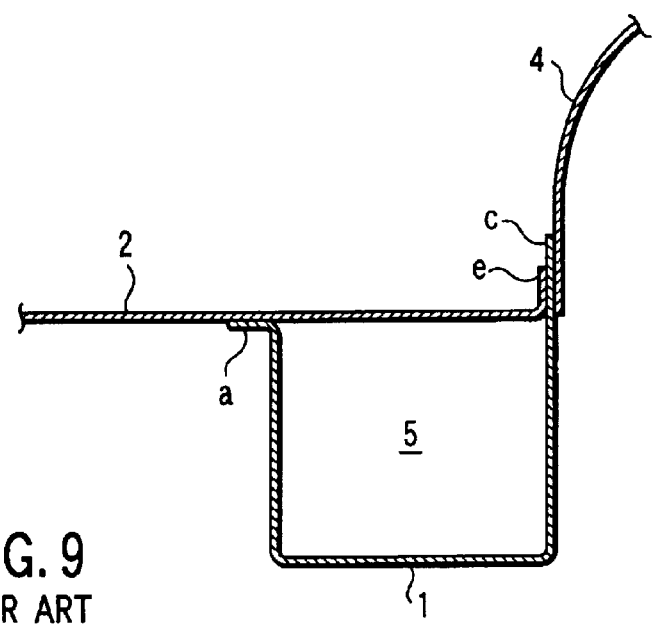
FIG. 9 is a sectional view taken along line IX—IX of FIG. 7.
Figure 7:
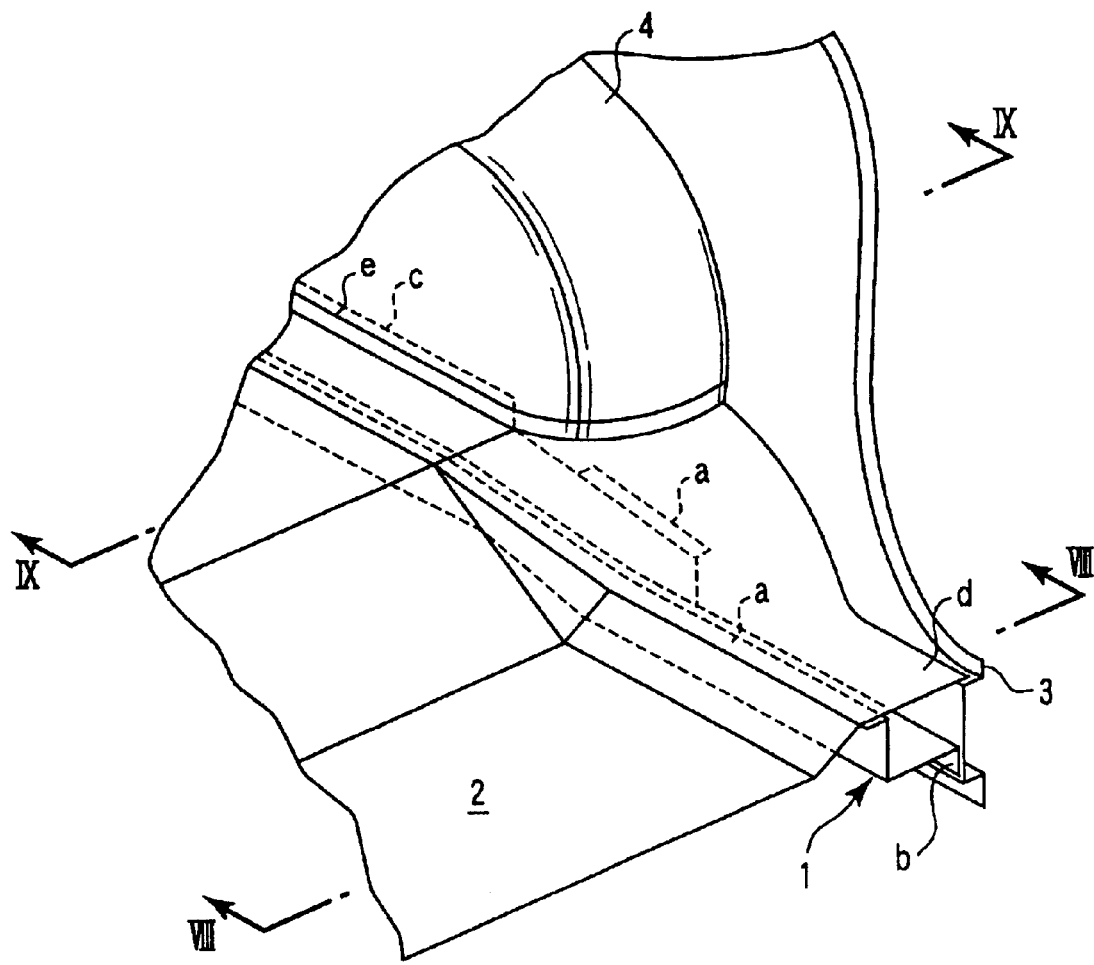
FIG. 7 is a schematic perspective view showing a part of a conventional vehicle body.

In another embodiment shown in FIGS. 5 and 6, a vehicle-exterior-side flange E of a lower member 12 is spot-welded to the lower surface of an upper member 11 on the vehicle-rear side of a side sill 14. At the rear part of the vehicle, moreover, a flange F of the upper member 11 is spot-welded to a rear wheel house 16. Thus, the upper member 11 and the lower member 12 form a third closed cross section 17 that is substantially continuous with the vehicle-rear side of a second closed cross section 15. The second embodiment shares other configurations with the foregoing embodiment. This embodiment (FIGS. 5 and 6) can also provide the same functions and effects of the foregoing embodiment (FIGS. 1 to 4).

The present invention can be effectively utilized to enhance the strength of those parts of a vehicle, such as an automobile, which is situated near a side member to which a side edge portion of a floor panel is coupled.

What is claimed is:

1. A vehicle body structure comprising:
   a side sill extending substantially along a side of a vehicle in a longitudinal direction thereof and forming a first closed cross section, which extends rearwardly toward a rear wheel well;
   a side member having at least a part thereof extending substantially in the longitudinal direction of the vehicle laterally inwardly from the side sill, the side member and the side sill forming a second closed cross section, which extends adjacent to the first closed cross section, the side member comprising an upper member and a lower member, and a flange formed on each of the upper member and the lower member, the flanges being coupled at least partially to each other, each of the flanges extending on a laterally inward side thereof substantially in the longitudinal direction of the vehicle; and
   a floor panel having a side edge portion coupled only the flange formed on the upper member.

2. A body structure according to claim 1, wherein at least a part of the flanges declines toward the front part of the vehicle.

3. A body structure according to claim 1, wherein the side member forms a third closed cross section substantially continuous with a vehicle-rear side of the second closed cross section, the third closed cross section extending substantially toward the rear part of the vehicle along a rear wheel well.

4. A body structure according to claim 2, wherein the side member forms a third closed cross section substantially continuous with a vehicle-rear side of the second closed cross section, the third closed cross section extending substantially toward the rear part of the vehicle along a rear wheel well.

* * * * *